United States Patent
Zhang et al.

(10) Patent No.: US 9,184,834 B1
(45) Date of Patent: Nov. 10, 2015

(54) METHOD AND APPARATUS FOR DETECTION AND CORRECTION OF TIME SKEW IN AN OPTICAL TRANSMITTER

(71) Applicant: Juniper Networks, Inc., Sunnyvale, CA (US)

(72) Inventors: Bo Zhang, San Jose, CA (US);
Theodore J. Schmidt, Gilroy, CA (US);
Steven Keck, Mountain View, CA (US);
Christian Malouin, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 271 days.

(21) Appl. No.: 13/730,193

(22) Filed: Dec. 28, 2012

(51) Int. Cl.
*H04B 10/04* (2006.01)
*H04B 10/077* (2013.01)
*H04B 10/556* (2013.01)
*H04L 27/36* (2006.01)
*H04B 10/50* (2013.01)

(52) U.S. Cl.
CPC ........ *H04B 10/0775* (2013.01); *H04B 10/5057* (2013.01); *H04B 10/50577* (2013.01); *H04B 10/5561* (2013.01); *H04L 27/364* (2013.01)

(58) Field of Classification Search
USPC .......................................................... 359/227
See application file for complete search history.

(56) References Cited

U.S. PATENT DOCUMENTS

| | | | | |
|---|---|---|---|---|
| 5,491,572 A * | 2/1996 | Ohara | .................. | H04B 10/079 370/242 |
| 7,639,945 B2 * | 12/2009 | Tamura | ................... | G02F 1/395 398/152 |
| 7,733,193 B2 * | 6/2010 | Kershteyn | ........... | H04L 27/2075 332/103 |
| 7,734,188 B2 * | 6/2010 | Kuwata | .................... | H04J 14/02 370/516 |
| 7,962,043 B2 * | 6/2011 | Conroy | ................ | H04B 10/532 398/152 |
| 7,970,285 B2 * | 6/2011 | Conroy | .............. | H04B 10/5057 398/102 |
| 8,428,183 B2 | 4/2013 | Khatana et al. | | |
| 8,565,621 B2 * | 10/2013 | Ibragimov | ............ | H04L 27/223 398/204 |
| 8,644,420 B2 * | 2/2014 | Khatana | ............. | H04B 10/5053 375/296 |
| 8,855,498 B2 * | 10/2014 | Tanaka | ............... | H04B 10/5055 398/159 |
| 2002/0118424 A1 * | 8/2002 | Miki | ....................... | H01S 5/068 398/192 |
| 2003/0184838 A1 * | 10/2003 | Akiyama | .............. | G02F 1/0121 359/239 |
| 2006/0291867 A1 * | 12/2006 | Tamura | ................... | G02F 1/395 398/152 |

(Continued)

FOREIGN PATENT DOCUMENTS

JP 2002084230 A * 3/2002

OTHER PUBLICATIONS

Z. Tao et al. "Simple, Robust, and Wide-Range Frequency Offset Monitor for Automatic Frequency Control in Digital Coherent Receivers" Conference on Optical Fiber communication/National Fiber Optic Engineers Conference, 2008, Feb. 24-28, 2008, 2 pages.

(Continued)

*Primary Examiner* — Ken Vanderpuye
*Assistant Examiner* — Amritbir Sandhu
(74) *Attorney, Agent, or Firm* — Harrity & Harrity, LLP

(57) ABSTRACT

In some embodiments, an apparatus includes an optical transmitter system that defines an interferometric structure and has an in-phase portion and a quadrature portion. The optical transmitter system has a transmission configuration and a calibration configuration. The interferometric structure can produce an output associated with a skew between the in-phase portion and the quadrature portion of the optical transmitter system when in the calibration configuration. The skew is associated with a digital domain, an analog domain and an optical domain of the optical transmitter system.

20 Claims, 7 Drawing Sheets

(56) References Cited

U.S. PATENT DOCUMENTS

| | | | | |
|---|---|---|---|---|
| 2007/0058989 | A1* | 3/2007 | Kaku | H04B 10/672 398/209 |
| 2008/0175586 | A1* | 7/2008 | Perkins | H04J 14/02 398/2 |
| 2009/0115544 | A1* | 5/2009 | Kershteyn | H04L 27/2075 332/103 |
| 2009/0148170 | A1* | 6/2009 | Perkins | H04B 10/5053 398/152 |
| 2009/0324253 | A1* | 12/2009 | Winzer | H04B 10/505 398/185 |
| 2009/0324257 | A1* | 12/2009 | Murakami | H04J 14/0221 398/200 |
| 2010/0119239 | A1* | 5/2010 | Wang | H04B 10/50575 398/198 |
| 2012/0008963 | A1* | 1/2012 | Aruga | H04B 10/5053 398/183 |
| 2012/0128357 | A1* | 5/2012 | Mukai | H04B 10/272 398/58 |
| 2012/0183294 | A1* | 7/2012 | Boertjes et al. | 398/49 |
| 2012/0224847 | A1* | 9/2012 | Ibragimov | H04L 27/223 398/16 |
| 2012/0250792 | A1* | 10/2012 | Khatana | H04B 10/5053 375/308 |
| 2012/0250793 | A1* | 10/2012 | Khatana | H04L 27/364 375/308 |
| 2012/0263468 | A1* | 10/2012 | Yaman | H04B 10/5561 398/65 |
| 2012/0308240 | A1* | 12/2012 | Akiyama | H04B 10/50575 398/141 |
| 2013/0266045 | A1* | 10/2013 | Lakkis | H04B 1/30 375/219 |
| 2014/0010530 | A1* | 1/2014 | Goebuchi | H04B 10/5057 398/25 |
| 2014/0133868 | A1* | 5/2014 | Krause | H04B 10/5051 398/184 |
| 2014/0178065 | A1* | 6/2014 | Mertz | H04B 10/5561 398/43 |

OTHER PUBLICATIONS

Kazuro Kikuchi, "Chapter 2, Coherent Optical Communications: Historical Perspectives and Future Directions" M. Nakazawa et al. (eds.), *High Spectral Density Optical Communication Technologies*, Optical and Fiber Communications Reports 6, DOI 10.1007/978-3-642-10419-02, © Springer-Verlag Berlin Heidelberg 2010, pp. 11-49.

Jens C. Rasmussen et al. "Digital Coherent Receiver Technology for 100-Gb/s Optical Transport Systems" Fujitsu Sci. Tech. J., vol. 46, No. 1, pp. 63-71 (Jan. 2010), pp. 63-71.

* cited by examiner

US 9,184,834 B1

METHOD AND APPARATUS FOR DETECTION AND CORRECTION OF TIME SKEW IN AN OPTICAL TRANSMITTER

BACKGROUND

Some embodiments described herein relate generally to methods and apparatus for the detection and correction of time skew in an optical transmitter. In particular, but not by way of limitation, some of the embodiments described herein relate to methods and apparatus for the detection and correction of time skew associated with the digital domain, the analog domain and the optical domain in an optical M-ary quadrature amplitude modulation (M-QAM) transmitter.

The optical M-ary quadrature amplitude modulation (M-QAM) scheme with digital signal processing (DSP) is an enabling technique for high bit rate (e.g., 100 Gbit/s and beyond) optical networks. Transmitter side serializer/deserializer (SerDes) and digital-to-analog converters (DACs) are building blocks for spectrally-efficient, multi-level signal generation and spectral manipulation.

Any timing misalignment between the in-phase portion (I tributary) and quadrature-portion (Q tributary) on the transmitter data path sourced from the digital, analog and/or optical domains will penalize M-QAM system performance. Hence, it is desirable for skew correction to contain the I/Q skew to less than the symbol unit interval (UI) (e.g., 10% of UI). This presents challenges for component designers and board designers particularly in the case of pluggable photonics, where the SerDes/DACs are not assembled with the photonic module in the factory, preventing an in-factory calibration and correction of the time skew.

Accordingly, a need exists for methods and apparatus for the detection and correction of time skews that can originate from the digital domain, the analog domain and the optical domain in an optical transmitter system.

SUMMARY

In some embodiments, an apparatus includes an optical transmitter system that defines an interferometric structure and has an in-phase portion and a quadrature portion. The optical transmitter system has a transmission configuration and a calibration configuration. The interferometric structure can produce an output associated with a skew between the in-phase portion and the quadrature portion of the optical transmitter system when in the calibration configuration. The skew is associated with a digital domain, an analog domain and an optical domain of the optical transmitter system.

DETAILED DESCRIPTION

In some embodiments, an apparatus includes an optical transmitter system having an in-phase portion and a quadrature portion. The optical transmitter system has a transmission configuration and a calibration configuration. The optical transmitter system leverages an interferometric structure when in the calibration configuration. The interferometer produces an output associated with a skew between the in-phase portion and the quadrature portion of the optical transmitter system. The skew is associated with a digital domain, an analog domain and an optical domain of the optical transmitter system.

In some embodiments, an apparatus includes an optical transmitter system that defines an interferometer having an in-phase portion and a quadrature portion. The apparatus also includes a control module that receives an output value from the interferometer. The control module can calculate a skew between the in-phase portion and the quadrature portion of the interferometer based on the output value. The skew is associated with a digital domain, an analog domain and an optical domain of the optical transmitter system. The control module can send a calibration signal to the optical transmitter system such that at least one of a delay for the in-phase portion of the optical transmitter system or a delay for the quadrature portion of the optical transmitter system is modified.

In some embodiments, a method includes receiving an output value of an interferometer of an optical transmitter system. The method includes calculating a skew between an in-phase portion and a quadrature portion of the interferometer based on the output value. The skew is associated with a digital domain, an analog domain and an optical domain of the optical transmitter system. The method further includes sending a calibration signal to the optical transmitter system such that at least one of a delay for the in-phase portion or a delay for quadrature portion of the optical transmitter system is modified.

As used in this specification, the singular forms "a," "an" and "the" include plural referents unless the context clearly dictates otherwise. Thus, for example, the term "a device" is intended to mean a single device or multiple devices.

Figure 1:
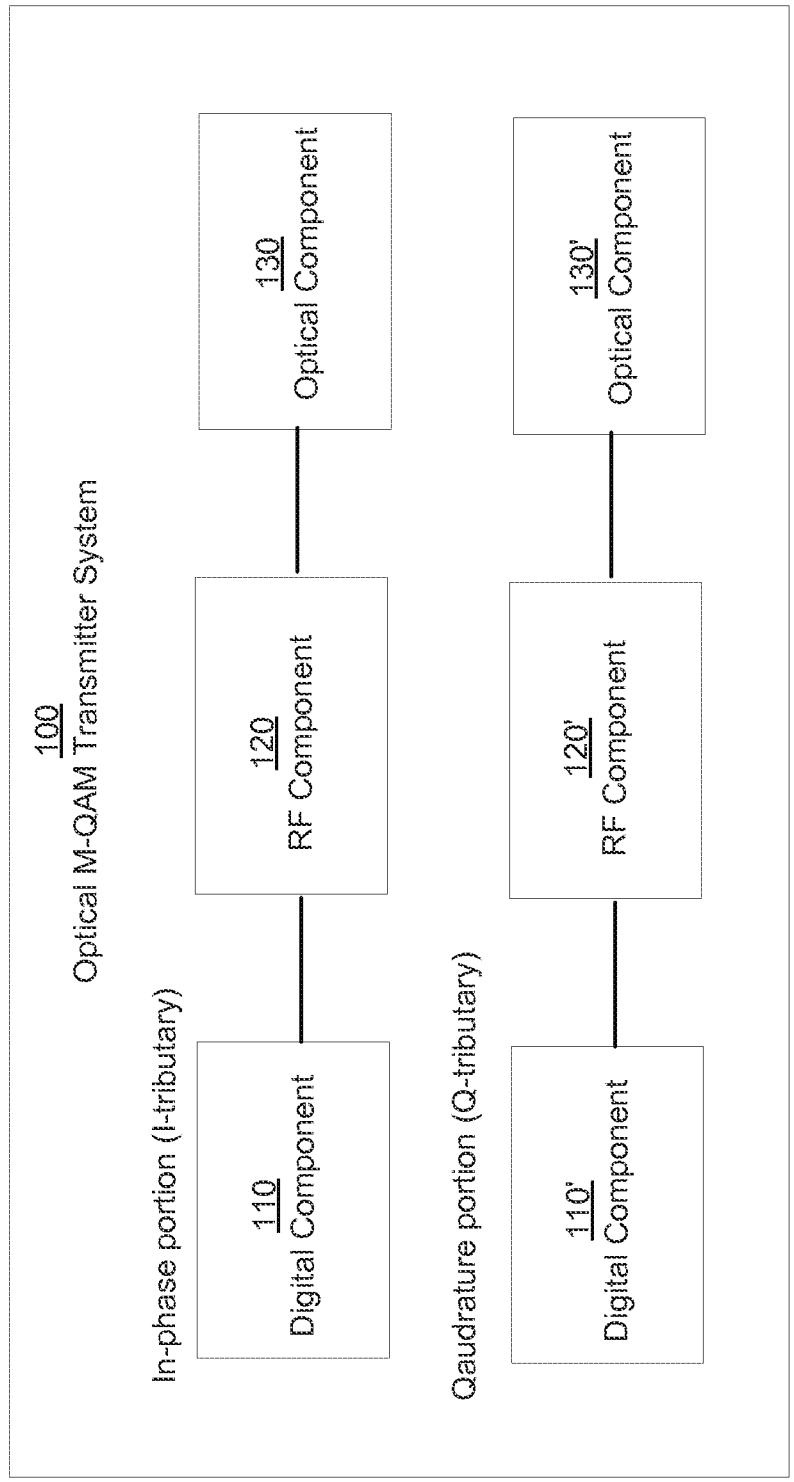
FIG. 1 is a logical block diagram of an optical M-QAM transmitter system, according to an embodiment.

FIG. 1 is a logical block diagram of an optical M-QAM transmitter system 100, according to an embodiment. The optical M-QAM transmitter system 100 includes a digital component 110 associated with the digital domain, a radio frequency (RF) component 120 associated with the analog domain, and an optical component 130 associated with the optical domain that are operably coupled for the in-phase portion (I-tributary) of the optical M-QAM transmitter system 100. Similarly, optical M-QAM transmitter system 100 includes a digital component 110' associated with the digital domain, a radio frequency (RF) component 120' associated with the analog domain, and an optical component 130' associated with the optical domain that are operably coupled for the quadrature portion (Q-tributary) of the optical M-QAM transmitter system 100. The optical M-QAM transmitter system 100 can be, for example, an optical M-ary quadrature amplitude modulation (M-QAM) transmitter. The digital components 110 and 110' can each include a serializer/deserializer (SerDes), a digital to analog converter (DAC), and a digital pattern generator. The digital components 110 and 110' can also include delay circuits associated with the in-phase portion (I-tributary) and the quadrature portion (Q-tributary), respectively, of the optical M-QAM transmitter system 100. The analog component 120 and 120' can include a set of radio frequency (RF) amplifiers for the in-phase portion (I-tributary) and the quadrature portion (Q-tributary), respectively, of the optical M-QAM transmitter system 100. The optical component 130 and 130' can include a set of Mach-Zehnder interferometers (or modulators) for the in-phase portion (I-tributary) and the quadrature portion (Q-tributary), respectively, of the optical M-QAM transmitter system 100. In some instances, the optical M-QAM transmitter system 100 can be operated in the calibration configuration. In other instances, the optical M-QAM transmitter system 100 can be operated in the transmission configuration.

Note that the optical M-QAM transmitter system 100 shown in and described with respect to FIG. 1 is one example of an optical transmitter system for which the time skew can be detected and compensated. In another example, the optical transmitter system can also include a direct detection receiver (instead of an optical coherent receiver) that does not include an in-phase portion (I-tributary) and a quadrature-phase portion (Q-tributary). In yet another example, the optical transmitter system can also include a polarization multiplexed (PM) M-QAM transmitter where two or more M-QAM transmitters in substantially orthogonal polarization states can be multiplexed in the polarization domain.

The in-phase portion (I-tributary) of the optical M-QAM transmitter system 100 can include, for example, a digital-to-analog convertor associated with the digital domain, an amplifier associated with the analog domain, and a Mach-Zehnder modulator (MZM) associated with the optical domain. The quadrature-phase portion (Q-tributary) of the optical M-QAM transmitter system can include, for example, a digital-to-analog convertor associated with the digital domain, an amplifier associated with the analog domain, and a MZM associated with the optical domain. Any timing misalignment of the in-phase (I) and quadrature (Q) tributaries on the transmitter sourced from either the digital component, analog component or optical component (or a combination of any of these) can result in incorrect orientation of the complex signal vector and thus can penalize the optical M-QAM transmitter system performance. Hence, it is desirable that the I/Q skew, which is the difference in arrival time of the simultaneously transmitted bits in the I-tributary and the Q-tributary, is minimized, for example, to less than a symbol unit interval (e.g., within 10% of the symbol unit interval). The symbol unit interval is the duration of time associated with each symbol (for example, a bit). The optical M-QAM transmitter system 100 can be configured, for example, to send or transmit an optical signal having an M-QAM modulation scheme at a bit rate of at least 100 Gbit/s and with the skew being less than a symbol unit interval (UI) of the optical signal. The symbol unit interval is the minimum time interval between condition changes in a data signal. The symbol unit interval is also known as the pulse time or the symbol duration time.

The optical M-QAM transmitter system 100 can use the coherent interference properties of the Mach-Zehnder interferometer-based optical modulator (MZM) to detect and compensate for large amounts (100's of symbol unit interval-UI) of I/Q skews in the signals sent by the transmitter. The in-phase portion of the optical M-QAM transmitter system 100 can receive a training signal from a digital component 110 and can send an output from the optical component 130 (e.g., the MZM of the in-phase portion) to a detector (not shown in FIG. 1). The training signal can include, for example, a pseudo-random bit sequence (PRBS) pattern or a 101010 alternating pattern. Similarly, the quadrature portion of the optical M-QAM transmitter system can also receive the training signal and can send an output from the optical component 130' (e.g., the MZM of quadrature-phase portion) to the detector. When the optical M-QAM transmitter system 100 is in the calibration configuration, the phase of the output of the optical component 130 (e.g., the MZM of the in-phase portion) is 180 degree out of phase from the phase of the output of the optical component 130' (e.g., the MZM of the quadrature portion). Additionally, during the skew correction process (calibration configuration) the output of the optical M-QAM transmitter system 100 can be blocked via, for example, an optical shutter located after the (optical) detector.

Figure 2:
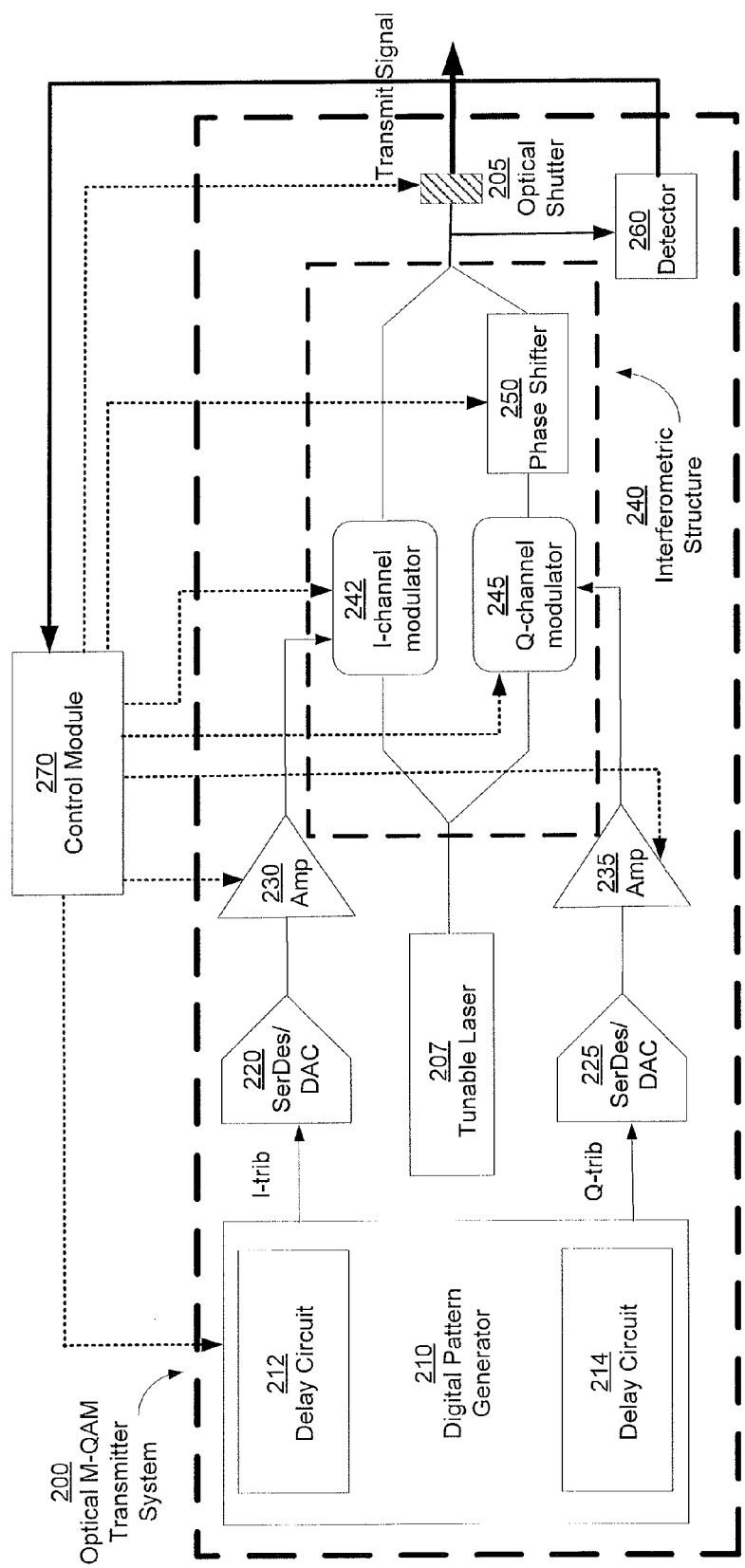
FIG. 2 is a system block diagram of an optical M-QAM transmitter system with a control module, according to an embodiment.

FIG. 2 is a system block diagram of an optical M-QAM transmitter system with a control module, according to an embodiment. The optical M-QAM transmitter system 200 includes a 180 degree phase shifter 250 and a detector 260. The detector 260 can include, for example, any type of low-speed, low-bandwidth optical detectors available commercially that can be used for the detection of the combined output of the interferometric structure 240. The interferometric structure 240 includes the I-channel modulator 242, the Q-channel modulator 245 and the phase shifter 250. The I-channel modulator 242 can be, for example, a MZM associated with the in-phase portion of the optical M-QAM transmitter system 205. Similarly, the Q-channel modulator 245 can also be, for example, a MZM associated with the quadrature-phase portion of the optical M-QAM transmitter system 200. The combined output signal of the interferometric structure 240 can be detector by the detector 260. Note that the output of the quadrature portion of the optical M-QAM transmitter system 200 is sent through a phase shifter 250 before signal combination takes place. The output of the detector 260 is sent to a control module 270. The control module 270 can be a hardware module and/or software module stored in the memory and/or executed in a processor. The control module 270 can be external to or located on the host circuit board of the optical M-QAM transmitter system 200. The control module 270 receives the output of the detector 260, which represents the I/Q skew generated between the in-phase portion and the quadrature portion of the optical M-QAM transmitter system 200.

The optical shutter 205 can have a first configuration and a second configuration. When the optical M-QAM transmitter system 200 is used in the calibration mode, the optical shutter 205 can be in the first configuration and can block an output of the optical M-QAM transmitter system 200. When the optical M-QAM transmitter system 200 is used in the transmission mode, the optical shutter 205 can be in the second configuration and can pass an output of the optical M-QAM transmitter system 200. The tunable laser 207 can provide a carrier electromagnetic continuous wave at a steady base frequency on which information can be imposed by the optical M-QAM transmitter system 200 by, for example, increasing the carrier signal strength, varying the carrier base frequency, varying the carrier wave phase, or by other means to transmit signals (or data) to external devices. The output from the optical shutter 205 is the modulated and transmitted signal.

When the optical M-QAM transmitter system 200 is used in the calibration configuration, the digital pattern generator 210 sends identical training signals (or patterns of bits) to both the I-tributary and the Q-tributary. Hence, the same pattern of data is sent through the serializer-deserializer/digital to analog converters (SerDes/DACs) 220 and 225, the amplifiers 230 and 235, and then modulated on the optical carrier wave via each of the I-channel and Q-channel modulators 242 and 245, respectively. Because the in-phase (I) and quadrature (Q) portion of the signal will be phase shifted by 180 degree before detection by the low speed detector 260, the power of the combined signal arriving at the detector 260 is expected to have minimum amplitude if no I/Q skew is present. The higher the skew between the I-tributary and the Q-tributary, the greater the magnitude of the power of the detected combined signal that can be expected. In some implementations, polarity inverting patterns (instead of identical patterns) can be sent from the digital pattern generator 210 to the I-tributary and the Q-tributary. In such implementations, the phase bias of the phase shifter 250 can be set to 0 degree (or absent from the optical M-QAM transmitter system 200) and destructive interference can take place between the signals in the I-tributary and the Q-tributary.

The digital pattern generator 210 can be a hardware module and/or software module (stored in the memory and executed in the processor) of the optical transmitter system (not shown in FIGS. 1 and 2) that can generate the digital training signals. The digital training signals can be a specific kind of electrical waveform varying between two conventional voltages that correspond to two logic states (low state' and 'high state', for '0' and '1', respectively). The voltage levels generated by a digital pattern generator 210 can be compatible with digital electronics input/output (I/O) standards such as, for example, Transistor-Transistor Logic (TTL), Low-voltage TTL (LVTTL), Low Voltage Complementary Metal Oxide Semiconductor (LVCMOS), Low-voltage differential signaling (LVDS), and/or the like. As mentioned above, in some instances, the digital pattern generator 210 can generate and send a known pseudo-random bit sequence (PRBS) pattern or an alternating "101010" pattern to the serializer-deserializer/digital-analog converters (SerDes/DACs) 220 and 225 associated with the in-phase portion (I-tributary) and quadrature portion (Q-tributary), respectively of the optical M-QAM transmitter system. The digital pattern generator 210 can send a training signal at a first time period with a symbol unit interval (UI) that is greater than the symbol unit interval associated with the baud rate of the optical M-QAM transmitter system 200. The digital pattern generator 210 can also send a training signal at a second time period (after the first time period) with a symbol unit interval that is equal or less than the symbol unit interval associated with the baud rate of the optical M-QAM transmitter system 200. In some other instances, the digital pattern generator can also send polarity inverting patterns to the SerDes/DACs 220 and 225 associated with the in-phase tributary and the quadrature tributary respectively.

The serializer-deserializer/digital-analog converters (SerDes/DACs) 220 and 225 each can be a hardware module that can be, for example, manufactured on a stand-alone integrated circuit chip or included in the processor of the optical transmitted system (not shown in FIGS. 1 and 2). The SerDes/DACs 220 and 225 can provide spectrally efficient, multi-level signal generation and spectral manipulation. The (SerDes/DACs) 220 and 225 each can include one or both of a serializer/deserializer (SerDes) and a digital-analog converter (DAC). A SerDes (or serializer/deserializer) typically includes a pair of functional blocks commonly used in high speed communications to compensate for limited input/output. The SerDes can be an integrated circuit transceiver that converts parallel data to serial data and vice-versa. The transmitter section of the SerDes is a serial-to-parallel converter, and the receiver section of the SerDes is a parallel-to-serial converter. Multiple SerDes interfaces can often be housed in a single integrated circuit package. The SerDes facilitates the transmission of parallel data between two locations over serial streams, thus reducing the number of data paths and thus the number of connecting pins or wires used on a device. In some instances, the SerDes devices are capable of full-duplex operation, where data conversion can take place in both directions simultaneously.

The digital-analog converter (DAC) of the SerDes/DAC 220 and 225 can convert the digital bit patterns sent by the digital pattern generator 210 into a continuously varying analog signal such as, for example, an optical signal, a radio-frequency (RF) signal, an audio signal, and/or the like. In some instances, the digital-to-analog conversion can degrade a signal, and hence conversion set-points can be set such that any errors induced in the conversion process are minimized. Referring to FIGS. 1 and 2, the digital pattern generator 210 and the SerDes/DACs 220 and 225 form the digital component 110 of the optical M-QAM transmitter system. Note that the DACs (220 and 225) in FIG. 2 are optional or not present for some modulation formats (e.g., QPSK or 4-QAM), as simple on-off-keying (OOK) signals on each tributary are sufficient. For such modulation formats, the DACs 220 and 225 can be 1-bit DACs.

The analog output signals from the SerDes/DACs 220 and 225 are sent to the driver amplifiers 230 and 235 that are associated with the I-tributary and the Q-tributary, respectively. The driver amplifiers 230 and 235 can be a type of electronic amplifier, for example, implemented in an integrated circuit on a chip (hardware) that can convert a low-power radio-frequency (RF) signal into a higher powered signal for, for example, driving a high powered device (for RF and optical applications), exciting resonant cavity structures such as interferometers, and/or the like. The driver amplifiers 230 and 235 can be optimized to have high efficiency, high output power compression, low return loss, high gain, and optimum heat dissipation. Referring to FIGS. 1 and 2, the driver amplifiers 230 and 235 form the analog component 120 of the optical M-QAM transmitter system. The amplified analog signals from the driver amplifiers 230 and 235 are sent to the I-channel and Q-channel modulators 242 and 245, respectively, that are associated with the optical M-QAM transmitter system.

The I-channel and Q-channel modulators 242 and 245 associated with the I-tributary and the Q-tributary, respectively, can be, for example, MZMs that can each modulate the incoming light from a tunable laser 207. The MZMs can be implemented in a waveguide that displays strong electro-optic effect (e.g., $LiNbO_3$, or the III-V semiconductors such as GaAs or InP). The incoming optical light from the tunable laser 207 is split into two parallel optical paths having substantially equal path lengths. The output of the Q-channel modulator 245 associated with the quadrature portion or the Q-tributary is sent to a (180 degree) phase shifter 250.

The (180 degree) phase shifter 250 can apply a substantially 180 degree phase shift to one of a training signal on the in-phase portion of the optical M-QAM transmitter system 200 or the training signal on the quadrature portion of the optical M-QAM transmitter system 200 when the optical M-QAM transmitter system 200 is in the calibration configuration. The phase shifter 250 can be a linear two port device that alters the phase of its output signal by 180 degree with respect to the input signal in response to, for example, an external electrical control signal. The difference between the input signal phase and the output signal phase is the sum of the phase shift due to light propagation through the phase shifter 250 in addition to the programmed phase shift. Typically, for high speed applications, the controlling elements in the phase shifter 250 can be semiconductor devices such as PIN, Schottky and varactor diodes. For high power applications, when slower switching speeds can be tolerated, ferrites can also be frequently employed in the construction of the phase shifter 250. The phase shifter 250 can be an analog phase shifter where the phase shift occurs continuously as the control signal is varied and therefore can offer almost unlimited resolution with monotonic performance. The final choice of the phase shifter 250 can depend on the performance desired such as, for example, desired bandwidth, insertion loss, switching speed, power handling, accuracy and resolution, and/or the like. In some configurations, the phase delayed output signal can pass though additional amplification components (not shown in FIG. 2) to reduce or minimize the effects of any signal loss in the phase shifter 250. As shown in FIG. 2, after shifting the phase of the output signal by 180 degree with respect to the input signal, the output of the phase shifter 250 (associated with the Q-tributary of the optical M-QAM transmitter system 200) is combined with the output of the I-tributary of the optical M-QAM transmitter system 200 and detected by the detector 260.

The detector 260 can detect the power of the combined signal output from the interferometric structure 240 that includes the in-phase portion (I-tributary) of the optical M-QAM transmitter system 200, and the (180 degree phase shifted) quadrature portion (Q-tributary) of the optical M-QAM transmitter system 200. The detector 260 can be a photodetector such as, for example, a photomultiplier tube (PMT), a charge coupled device (CCD) camera, a photodiode array detector, a pixel array detector, an avalanche photodiode (APD), and/or the like. After detecting the power of the combined signal output from the interferometric structure 240, the detector 260 can send an output voltage to the control module 270.

Figure 3:
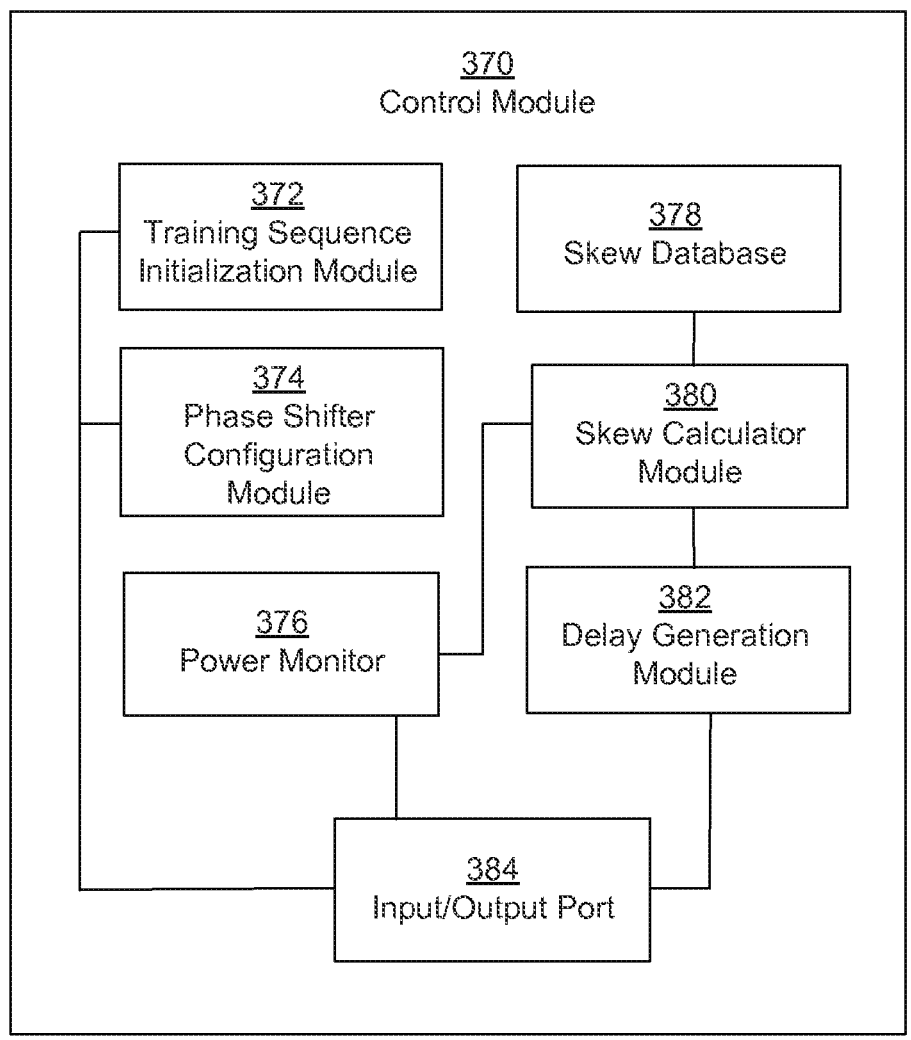
FIG. 3 is system block diagram of a control module, according to an embodiment.

The control module 270 can receive a value of the output of the interferometric structure 240 that contains information about the I/Q skew between the in-phase portion (I-tributary) and the quadrature portion (Q-tributary) of the optical transmitter M-QAM system 200, and can calculate the skew between the in-phase portion and the quadrature portion of the interferometer (I/Q skew) based on the value received from the interferometric structure 240, as described in greater detail herein (see FIG. 3). The skew is associated with the digital domain (e.g., digital component 110 in FIG. 1), the analog domain (e.g., analog component 120 in FIG. 1) and the optical domain (e.g., optical component 130 in FIG. 1) of the optical transmitter M-QAM transmitter system 200. The control module 270 can send a calibration signal to the optical M-QAM transmitter system 200 such that a delay for the in-phase portion (I-tributary) and/or a delay for the quadrature portion (Q-tributary) of the optical M-QAM transmitter system 200 is modified based on the calibration signal. The control module 270 sends the calibration signal that accounts for the I/Q skew the delay circuits 212 and/or 214 in the digital pattern generator 210. The control module 270 also controls the bias points of the I-channel modulator 242 and the Q-channel modulator 245, and the driving level of the (RF) amplifiers 230 and 235. The bias points of both I-channel modulator 242 and the Q-channel modulator 245 can be controlled in a similar manner. The halfwave voltage, Vpi, of a modulator (242 or 245) is defined as the difference between the applied voltage at which the signals in each branch of the modulator (242 or 245) are in phase and the applied voltage at which the signals are 180 degree out of phase. Hence, Vpi is the voltage difference between maximum and minimum output signal power of the modulator (242 or 245). For modulator (242 or 245) to be used most efficiently in a communications system, the value of Vpi can be accurately determined, for example, to determine RF-amplifier settings. If the modulator (242 and/or 245) bias is set at null bias, 2*Vpi driving level from the (RF) amplifier (230 and/or 235) can be applied. If the modulator (242 and/or 245) bias is set at quadrature bias, Vpi driving level from the (RF) amplifier (230 and/or 235) can be applied. Additionally, the control module 270 can also send a signal that can control the configuration status of the optical shutter 205 during operation of the M-QAM transmitter system 200 in both the calibration mode and the transmission mode. A detailed description of the functionalities of the control module 270 is provided below with respect to FIG. 3.

The delay circuits 212 and 214 can be, for example, programmable circuits that can provide a delay to a digital pulse train (training signal) generated by the digital pattern generator 210 based on a calibration signal sent by the control module 270. The delay circuits 212 and 214 can receive a calibration signal from the control module 270 after a first time and before a second time, and can introduce a delay value (based on the calibration signal) into the training signal sent by the digital pattern generator 210 at a second time to at least one of the in-phase portion or quadrature-phase portion of the optical M-QAM transmitter system 200. This is done so that the skew between the in-phase portion (I-tributary) and the quadrature portion (Q-tributary) of the optical M-QAM transmitter system 200 at the second time is smaller than the skew between the in-phase portion (I-tributary) and the quadrature portion (Q-tributary) of the optical M-QAM transmitter system 200 at the first time.

The methods and apparatus proposed to detect both large amounts of I/Q skew and small amounts of I/Q skew as shown in FIGS. 1 and 2 has the advantage of compensating for skews that originate not only in the digital domain and analog RF domain but also skews that originate in the optical domain. For example, any waveguide skew misalignment can also be compensated. As an added advantage, a low speed analog detector 260 can be used to monitor the combined power output from the interferometric structure 240. One of the aims of the proposed technique is to minimize the DC power used to drive the various components of the optical M-QAM transmitter system 200, which can also minimize any skew originating from the digital and analog domains.

FIG. 3 is system block diagram of a control module 370, according to an embodiment. As described above, the control module 370 can be external to or located on the host circuit board of the optical M-QAM transmitter system. When located on the host circuit board of the optical M-QAM transmitter system, the control module 370 can be a hardware module and/or software module stored in the memory and/or executed in a processor on the host circuit board of the optical M-QAM transmitter system. The control module 370 can receive an output value of an interferometric structure of the optical M-QAM transmitter system within a first time period. The control module 370 can calculate a skew associated with the first time period between the in-phase portion (I-tributary) and quadrature portion (Q-tributary) of the interferometric structure 240 based on the output for the first time period. The skew for the first time period is associated with the digital domain, the analog domain and the optical domain of the optical M-QAM transmitter system. The control module 370 can send a calibration signal associated with the first time period to the optical M-QAM transmitter system such that the delay for the in-phase portion and/or the delay for the quadrature portion of the optical M-QAM transmitter system is modified. The output value, the skew and the calibration signal at the first time period is each associated with a training signal having a first symbol unit interval, where the first symbol unit interval is greater than a symbol unit interval associated with a baud rate of the optical M-QAM transmitter system.

The control module 370 can receive an output value of the interferometric structure 240 of the optical M-QAM transmitter system within a second time period. The output value of the interferometric structure 240 within the second time period has been adjusted by the calibration signal at the first time. This calibration/adjustment can be coarse calibration/adjustment. The second time period relates to finer calibration/adjustment.

The control module can calculate a skew associated with the second time period between the in-phase portion (I-tributary) and the quadrature portion (Q-tributary) of the interferometric structure 240 based on the output for the second time period. The skew for the second time period is also associated with the digital domain, the analog domain and the optical domain of the optical M-QAM transmitter system. The control module can send a calibration signal associated with the second time period to the optical M-QAM transmitter system such that the delay for the in-phase portion and/or the delay for the quadrature portion of the optical M-QAM transmitter system is modified. The output value, the skew and the calibration signal at the second time period is each associated with a training signal having a second symbol unit interval, where the second symbol unit interval is equal or less than a symbol unit interval associated with the baud rate of the optical M-QAM transmitter system. Additionally, the delay for the in-phase portion and/or the delay for the quadrature portion for the training signal having the first symbol unit interval is greater than the delay for the in-phase portion and/or the delay for the quadrature portion for the training signal having the second symbol unit interval The control module 370 includes a training sequence initialization module 372, a phase shifter configuration module 374, a power monitor 376, a skew database 378, a skew calculator module 380, a delay generation module 382 and an input/output port 384. The training sequence initialization module 372 can send (via the input/output port 384) to the digital pattern generator (e.g., digital pattern generator 210 in FIG. 2) a signal that contains or represents information and/or instructions about the training signal to send to the I-tributary and the Q-tributary of the optical M-QAM transmitter system. For example, in some instances, the training sequence initialization module 372 can send instructions to the digital pattern generator to generate and send a pseudo-random bit sequence (PRBS) pattern as the training signal to the I-tributary and the Q-tributary of the optical M-QAM transmitter system. In other instances, the training sequence initialization module 372 can send instructions to the digital pattern generator to generate and send an alternating "101010" bit sequence as the training signal to the I-tributary and the Q-tributary of the optical M-QAM transmitter system. In yet other instances, the training sequence initialization module 372 can send instructions to the digital pattern generator to generate and send a polarity inverting bit sequence as the training signal to the I-tributary and the Q-tributary of the optical M-QAM transmitter system.

The phase shifter configuration module 374 can send a signal (via the input/output port 384) to the phase shifter (e.g., phase shifter 250 in FIG. 2) that contains or represents information and/or instructions about the phase shift to induce in the quadrature portion (Q-tributary) signal of the optical M-QAM transmitter system. For example, in some instances, during operation of the optical M-QAM transmitter system in the calibration configuration, the phase shifter configuration module 374 can send a signal to the phase shifter that contains or represents information and/or instructions to shift the phase of the Q-tributary signal by nominally 180 degree if the training signals sent to the I-tributary and Q-tributary of the M-QAM transmitter system are identical and not polarity inverting. In other instances, the phase shifter configuration module 374 can send a signal to the phase shifter that contains or represents information and/or instructions to set the phase delay of the Q-tributary signal to nominally 0 degree if the training signal sent to the I-tributary and the Q-tributary of the M-QAM transmitter system is polarity inverting. Additionally, during operation of the optical M-QAM transmitter system in the transmission configuration, the phase shifter configuration module 374 can send a signal to the phase shifter that contains or represents information and/or instructions to shift the phase of the Q-tributary signal by nominally 90 degree to prepare for data transmission.

The power monitor 376 can be, for example, a power monitoring chip connected to the host circuit board of the optical M-QAM transmitter system. The power monitor 376 can measure the power associated with the DC voltage output of the detector 260. The DC voltage output of the detector 260 contains or represents information about the skew associated with the in-phase portion (I-tributary) of the optical M-QAM transmitter system and the quadrature portion (Q-tributary) of the optical M-QAM transmitter system. The power monitor 376 can send a signal representing the magnitude of the measured power to the skew calculator module 380 via, for example, an internal bus of the host circuit board. In some configurations, the power monitor 376 can also generate and send a signal warning of an impending power failure before regulated DC voltages in the host circuit board go out of specification by monitoring high voltage inputs to the power monitor 376. This can facilitate a timely and orderly shutdown and an automatic restart of the optical M-QAM transmitter system.

The skew calculator module 380 receives a signal representing the magnitude of the power associated with the output of the detector from the power monitor 376 and can access the entries of the skew database 378 (or lookup table) based on the signal received. The entries in the skew database 378 can contain or represent instructions and/or information that can be used by the skew calculator module 380 to calculate the skew between the I-tributary and the Q-tributary of the optical M-QAM transmitter system based on the output value of the detector 260, the pattern length of the training signal, and the bit rate of the training signal. The entries of the skew database 378 can be updated on a periodic interval or repeated based on a semi-periodic interval, and can contain or represent information that can be used by the skew calculator module 380 to compute the skew between the I-tributary and the Q-tributary during each reset or startup cycle of the of the optical M-QAM transmitter system.

In some configurations, several iterations of skew correction can be performed to compensate for the skew between the I-tributary and the Q-tributary of the optical M-QAM transmitter system. For example, first, a low bit rate pattern can be sent from the digital pattern generator to the I-channel and the Q-channel modulators associated with the in-phase portion (I-tributary) and the quadrature portion (Q-tributary) of the optical M-QAM transmitter system respectively to perform a coarse skew calculation. The coarse skew adjustment can be representative of the inter-symbol portion (or multiple symbol unit intervals) of the skew as shown in FIG. 4.

Following coarse skew adjustment, a high bit rate pattern (closer to the baud rate of the device) can be sent from the digital pattern generator to the I-channel and the Q-channel modulators associated with the in-phase portion (I-tributary) and the quadrature portion (Q-tributary) of the optical M-QAM transmitter system, respectively, to perform a fine skew adjustment. The fine skew adjustment can be performed to compensate for either the inter-symbol or the intra-symbol portion of the skew as shown in FIG. 4 (a few UIs or sub-UI). In some instances, the skew adjustment techniques (for both inter-symbol skew and intra-symbol skew) can be repeated multiple times to compensate for the I/Q skew in the optical M-QAM transmitter system. Following coarse and fine skew adjustment, the skew calculator module 380 can send to the delay generation module 382 a signal that represents information about the delay value to compensate for the skew between the in-phase portion (I-tributary) and the quadrature portion (Q-tributary) of the optical M-QAM transmitter system.

Figure 4:
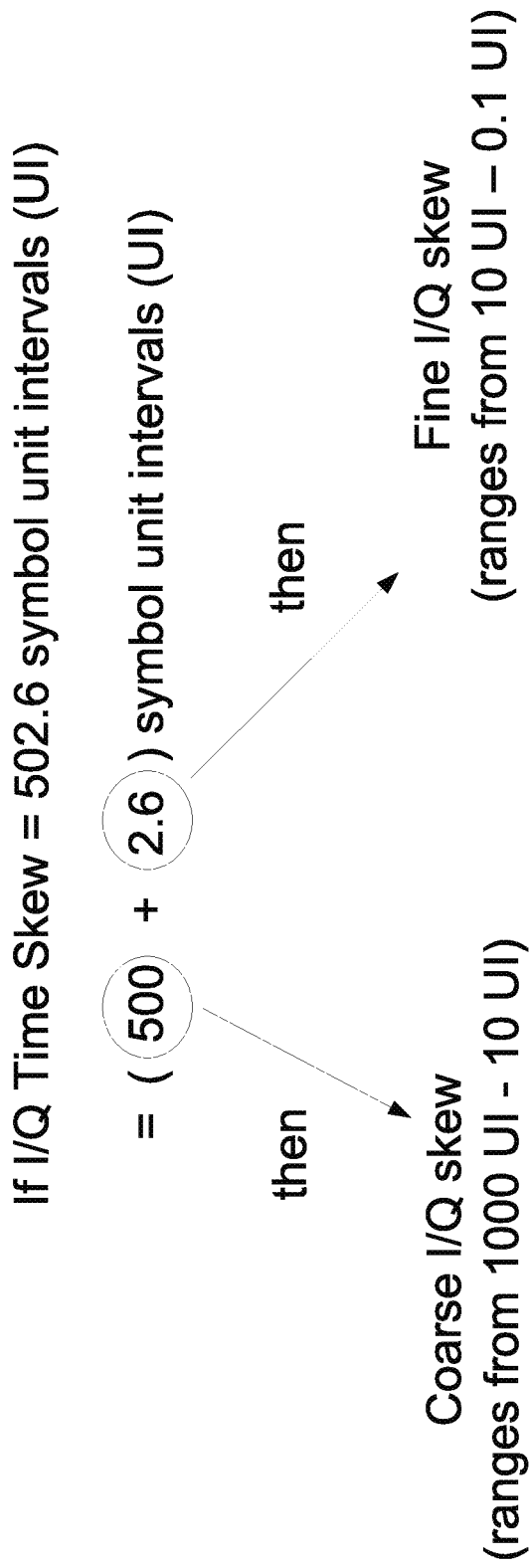
FIG. 4 presents an example of the difference between the coarse I/Q skew and the fine I/Q skew for a skew of 502.6 symbol unit intervals (UI).

FIG. 4 presents an example of the difference between the coarse I/Q skew and the fine I/Q skew for a skew of 502.6 symbol unit intervals (UI). For coarse skew detection and compensation and/or fine skew detection and compensation, each step of the process can nominally have a dynamic detection range of 20 dB (corresponding to a factor of 100 skew range in linear scale). Hence, the fine skew detection and compensation step can use a one tenth (1/10) symbol rate training signal (10 times the symbol time period than that of the transmission signal) to cover the range of 10 UI to 0.1UI (compensation target). Additionally, the coarse skew detection and compensation step can use a one thousands (1/1000) symbol rate training signal (1000 times the time period of the transmission signal) to cover the range of 1000 UI to 10 UI.

Note that the coarse skew correction can be adjusted via digital delays in the digital pattern generator on both the I-tributary and the Q-tributary. Fine skew correction, however, can be accomplished, for example, via the SerDes/DAC using a 1 sample/symbol "sampling point" adjustment or via adjustment in the digital signal processing domain through digital filter implementation for which a DAC with a 2 sample/symbol sampling rate can be used.

The delay generation module 382 can receive from the skew calculator module 380 a signal that is representative of the calculated skew between the in-phase portion (I-tributary) and the quadrature portion (Q-tributary) of the optical M-QAM transmitter system. The delay generation module 382 can generate a delay value based on the signal that is received from the skew calculator module 380 and that can compensate for the skew between with the in-phase portion (I-tributary) and the quadrature portion (Q-tributary) of the optical M-QAM transmitter system. The delay can be, for example, in microseconds, milliseconds, or seconds. The delay generation module 382 can send a signal representative of value of the delay that can compensate for the skew between the in-phase portion (I-tributary) and the quadrature portion (Q-tributary) of the optical M-QAM transmitter system to the input/output port 384. The signal representing the delay value is sent via the input/output port 384 to one or both of the delay circuits in the digital pattern generator of the optical M-QAM transmitter system. Note that the delay can either be generated in the digital domain, as shown in FIGS. 2 and 3, or can be generated by adjusting the sampling point of the DAC (if the skew is less than the DACs sampling interval).

Figure 5:
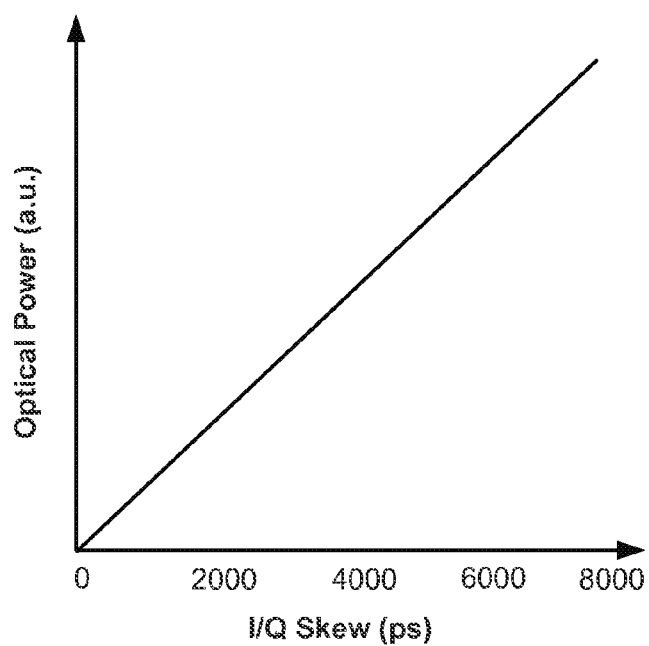
FIG. 5 shows a graphical example of the monitored optical power as a function of large I/Q skew (hundreds of UI skew) for a training signal with a relatively low bit rate (100 Mbit/s).

FIG. 5 shows a graphical example of the monitored optical power as a function of large I/Q skew for a training signal with a relatively low bit rate. In this example, a simulation was performed using 100 Mb/s 2^7-1 pseudo-random bit sequence (PRBS) patterns injected to both the I-tributary and the Q-tributary. The simulation results involve detecting and compensating for 100's unit interval (UI) skew from a 32 Gbaud optical Quadrature phase-shift keying (QPSK) (4-QAM) signal. The bit rate of 100 Mbit/s results in a detection range of 10 ns (inverse of the bit rate) that corresponds to more than 300 UI of I/Q delays for a 32 Gbaud signal (the UI for a 32 Gbaud signal is ~31 ps). Based on the linear relationship of monitored optical power with I/Q skew, the skew can be brought down to 100 ps given a photodetector with 20 dB dynamic range. Based on the residual skew (100 ps corresponds to a few UI for a 32 Gbaud signal), the training signal can be configured (via adjusting the clock source to the digital pattern generator logic) to a higher bit rate to have finer delay detection resolution.

Figure 6:
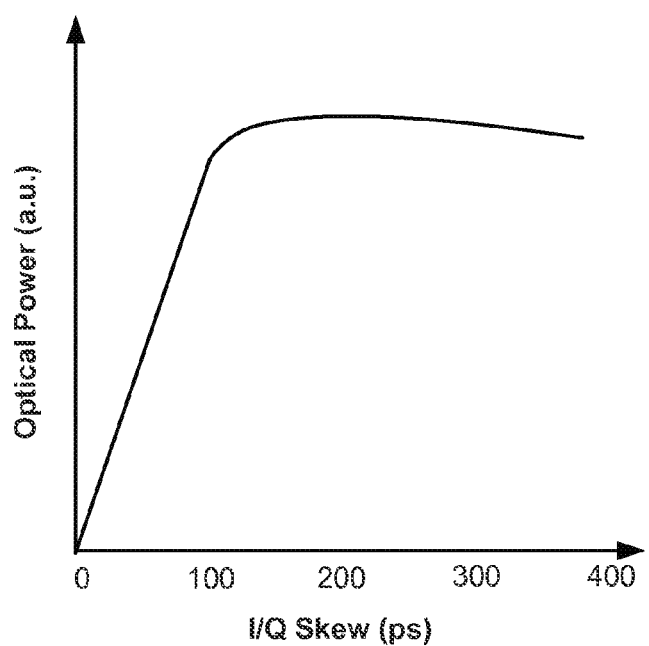
FIG. 6 shows a graphical example of the monitored optical power as a function of small I/Q skew (a few UI skew) for a training signal with a relatively high bit rate (10 Gbit/s).

FIG. 6 shows a graphical example of the monitored optical power as a function of small I/Q skew for a training signal with a relatively large bit rate. In this example, a simulation was performed using 10 Gbit/s 2^7-1 pseudo-random bit sequence (PRBS) patterns injected to both the I-tributary and the Q-tributary. As shown in FIG. 6, the optical power reaches a saturation point (at approximately 100 ps) and does not increase with increasing I/Q skew. As also shown in FIG. 6, when a 10 Gbit/s pattern is injected, based on the optical power as a function of I/Q skew, the I-tributary and the Q-tributary can be further deskewed to approximately 1 ps with a photodetector with more than 20 dB dynamic range. To enable skew calibration, the digital pattern generator (e.g., digital pattern generator 210 in FIG. 2) can use an independent barrel shifter for each of the I and Q tributaries that can allow a configurable static delay to be added to each channel before the input to the SerDes/DAC (e.g., SerDes/DAC 220 and 225 in FIG. 2).

Figure 7:
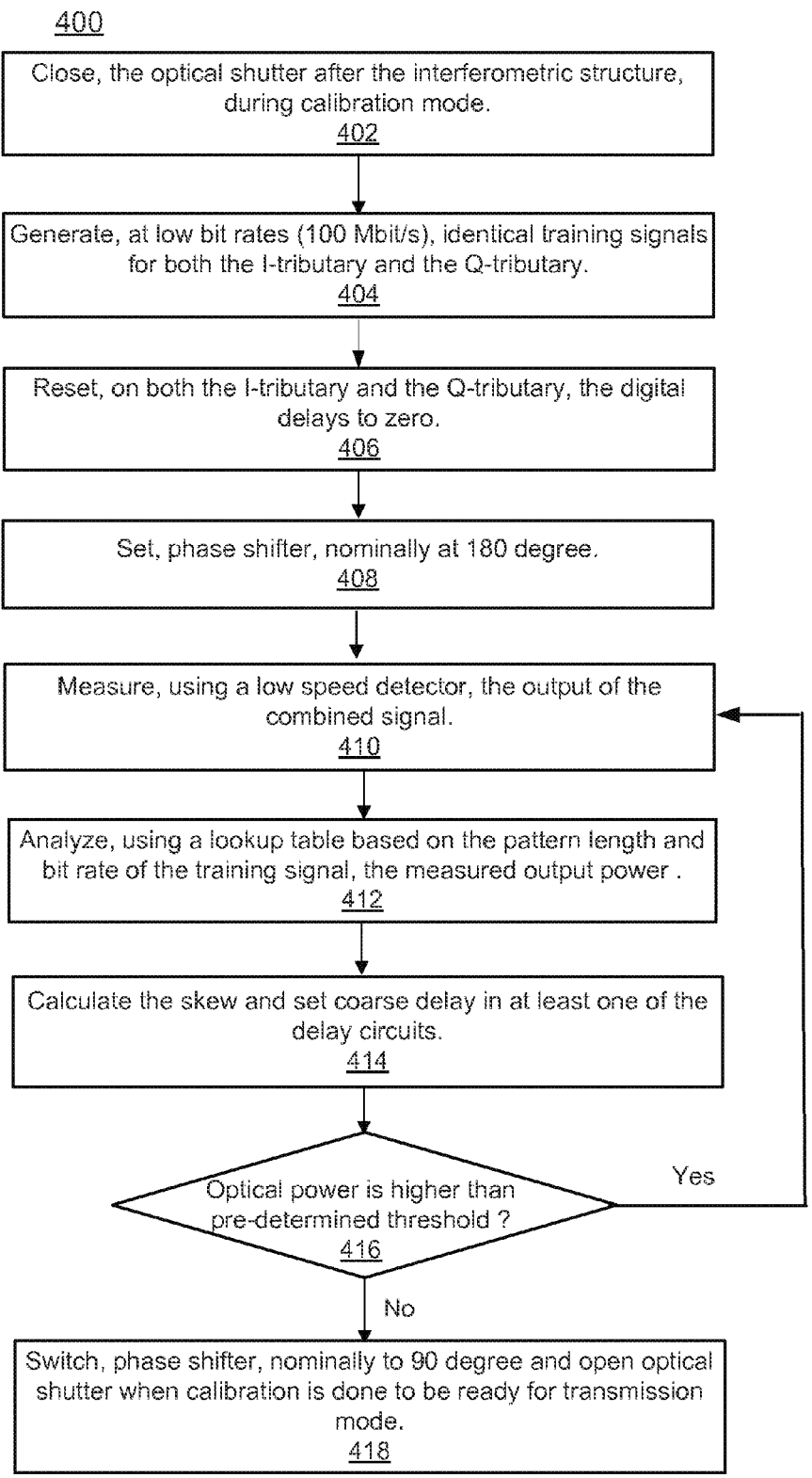
FIG. 7 is a flow chart illustrating a method for coarse skew detection and correction, according to an embodiment.

FIG. 7 is a flow chart illustrating a method for coarse skew detection and correction, according to an embodiment. The method 400 includes closing the optical shutter (located after the interferometric structure) during calibration mode before the tunable laser is enabled and the training sequence is generated so that the transmitter output can be blocked during the skew tuning process, at 402.

At 404, low bit rate (e.g., 100 Mbit/s) identical training signals are generated for both the I-tributary and the Q-tributary of the optical M-QAM transmitter system. As described above, the training signals generated can be pseudo random bit sequences (PRBS) or altering patterns of "101010". In some instances, the training signals sent to the I-tributary and the Q-tributary can be polarity inverting. The training signals can be generated at, for example, the digital pattern generator. The digital pattern generator can be a hardware module and/or software module stored in the memory and executed in the processor of the optical M-QAM transmitter system that can generate training signals. As described above, the voltage levels generated by a digital pattern generator can be compatible with digital electronics I/O standards such as, for example, Transistor-Transistor Logic (TTL), Low-voltage TTL (LVTTL), Low Voltage Complementary Metal Oxide Semiconductor (LVCMOS), Low-voltage differential signaling (LVDS), and/or the like. The training signals generated by the digital pattern generator can be sent to the serializer-deserializer/digital-analog converters (SerDes/DACs) associated with the in-phase (I) tributary and quadrature (Q) tributary of the optical M-QAM transmitter system.

At 406, the digital delays on both the I-tributary and the Q-tributary of the optical M-QAM transmitter system are reset to zero. The delays are reset by, for example, the delay circuits located in the digital pattern generator. As described above, the control module can send the signal instructing the delay circuits to implement the digital delays.

At 408, the phase shifter is nominally set at 180 degree. As described above, the phase shifter is controlled by the phase shifter configuration module (located in the control module) that can periodically or repeatedly send a signal to the phase shifter to change the set-points of the phase shifter. Depending on the mode of operation of the optical M-QAM transmitter system (either calibration mode or transmission mode) and the training signals sent by the digital pattern generator to the I-tributary and/or the Q-tributary, the phase shifter can be set to, for example, 0 degree, 90 degree, 180 degree, and/or the like.

At 410, the output of the combined signal is measured using a low-speed detector. The combined signal includes the signals from the in-phase portion (I-tributary) and the quadrature portion (Q-tributary) of the optical M-QAM transmitter system.

At 412, the measured output power is analyzed using a lookup table based on the pattern length of the training signal and the bit rate of the training signal. As described above, the lookup table can be located at, for example, the control module. The entries in the lookup table can contain or represent instructions and/or information that can allow, for example, the skew calculator module to calculate the skew between the I-tributary and the Q-tributary of the optical M-QAM transmitter system based on the output value of the detector, the pattern length of the training signal, and the bit rate of the training signal. As described above, the entries of the lookup table can be updated on a periodic interval or repeated basis that can allow the skew calculator module to compute the skew between the I-tributary and the Q-tributary of the optical M-QAM transmitter system.

At 414, the skew is calculated at, for example, the skew calculator module (located in the control module) and the coarse delay for compensating for the skew is sent from, for example, the delay generation module (located in the control module) to the delay circuit associated with either the in-phase portion (I-tributary) and/or the quadrature portion (Q-tributary) of the optical M-QAM transmitter system. The skew is calculated by the skew calculator module based on the entry of the lookup table accessed by the skew calculator module. The delay can be, for example, in microseconds, milliseconds, or seconds.

At 416, the optical power is measured again at, for example, the low-speed detector. If the optical power is higher than a pre-determined threshold value, steps 410-416 are repeated. The pre-determined threshold value can be set depending on the level of skew correction desired during the calibration configuration of the optical M-QAM transmitter system. A low threshold value is indicative of robust skew detection and correction. If the optical power is not higher than the pre-determined threshold value, the phase shifter is nominally set to 90 degree and the optical shutter after the interferometric structure is opened, at 418. This can prepare the optical M-QAM transmitter system to operate in the transmission mode.

Figure 8:
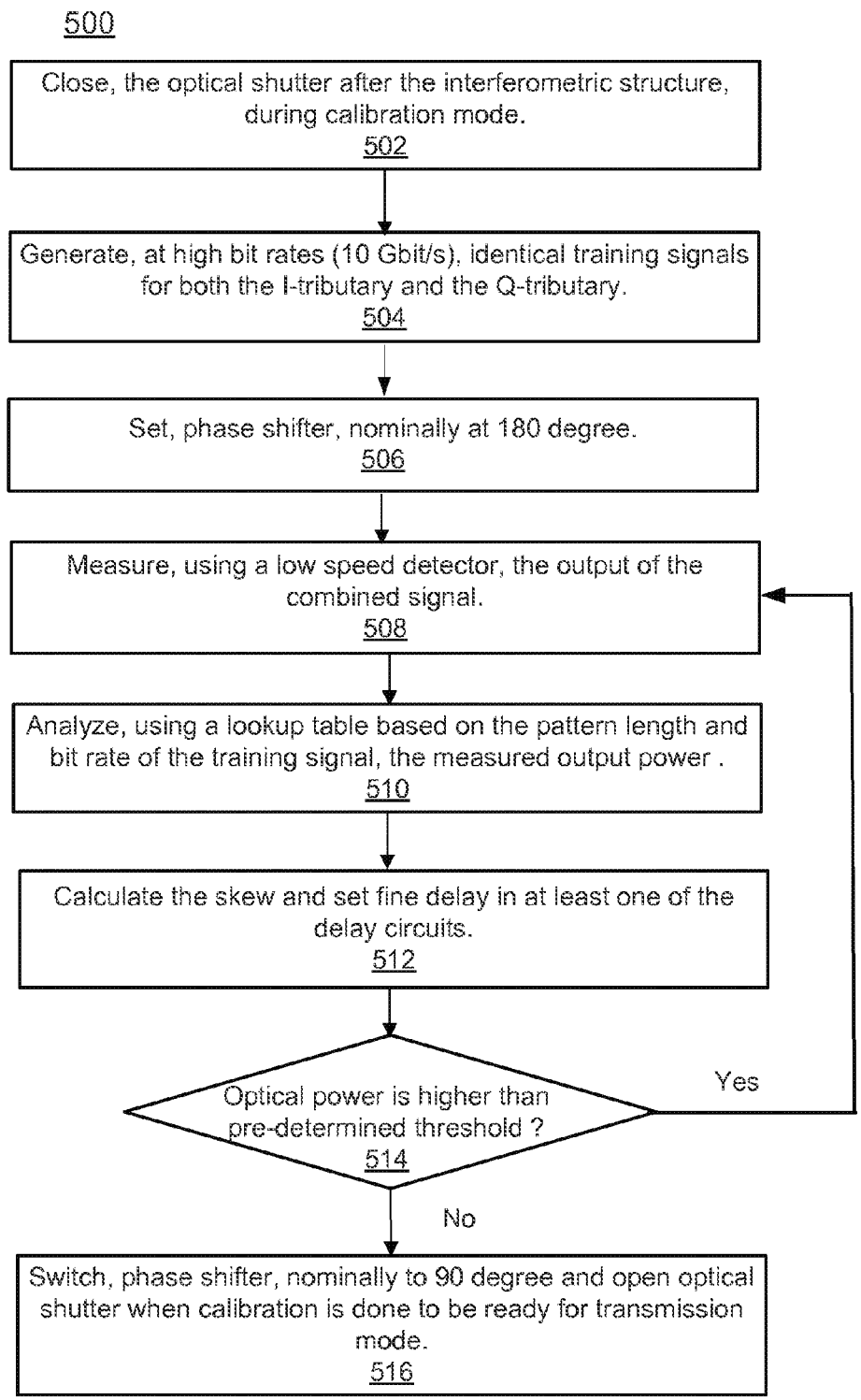
FIG. 8 is a flow chart illustrating a method for fine skew detection and correction, according to an embodiment.

FIG. 8 is a flow chart illustrating a method for fine skew detection and correction, according to an embodiment. The method 500 includes closing the optical shutter (located after the interferometric structure) during calibration mode before the tunable laser is enabled and the training sequence is generated so that the transmitter output can be blocked during the skew tuning process, at 502.

At 504, high bit rate (10 Gbit/s) identical training signals are generated for both the I-tributary and the Q-tributary. As described above, the high bit rate training signals generated can also be pseudo random bit sequences (PRBS) or altering patterns of "101010". In some instances, the training signals sent to the I-tributary and the Q-tributary can also be polarity inverting. Similar to the case of the low bit rate training signals, the high bit rate training signals can also be generated at, for example, the digital pattern generator. Similar to the case of the low bit rate training signals, the high bit rate training signals generated by the digital pattern generator can also be sent to the serializer-deserializer/digital-analog converters (SerDes/DACs) associated with the in-phase portion (I-tributary) and the quadrature portion (Q-tributary) of the optical M-QAM transmitter system.

At 506, the phase shifter is nominally set at 180 degree. As described above and similar to the case of the low bit rate training signals, the phase shifter is controlled by the phase shifter configuration module (located in the control module) that can periodically or repeatedly send a signal to the phase shifter to change the set-points of the phase shifter. Depending on the mode of operation of the optical M-QAM transmitter system (either calibration mode or transmission mode) and the training signal sent by the digital pattern generator to the I-tributary and/or the Q-tributary, the phase shifter can be set to, for example, 0 degree, 90 degree, 180 degree, and/or the like.

At 508, the output of the combined signal is measured using a low-speed detector. Similar to the case of the low bit rate training signals, the combined signal for the high bit rate training signals also includes the signals from the in-phase portion (I-tributary) and the quadrature portion (Q-tributary) of the optical M-QAM transmitter system.

At 510, the measured output power is analyzed using a lookup table based on the pattern length and the bit rate of the training signal. Similar to the case of the low bit rate training signal, the lookup table can be located at, for example, the control module. The entries in the lookup table can contain or represent instructions and/or information that can allow, for example, the skew calculator module to calculate the skew between the I-tributary and the Q-tributary of the optical M-QAM transmitter system based on the output value of the detector, the pattern length of the training signal, and the bit rate of the training signal.

At 512, the skew is calculated at, for example, the skew calculator module (located in the control module) and the fine delay for compensating for the skew is sent from, for example, the delay generation module (located in the control module) via an input/output port to least one of the delay circuits associated with either the in-phase portion (I-tributary) or the quadrature portion (Q-tributary) of the optical M-QAM transmitter system. The skew is calculated by the skew calculator module based on the entry of the lookup table accessed by the skew calculator module. The delay can be, for example, in microseconds, milliseconds, or seconds.

At 514, the optical power of the combined signal is measured again at, for example, the low speed detector. If the optical power is higher than a pre-determined threshold value, steps 508-514 are repeated. The pre-determined threshold value can be set depending on the level of skew correction required in the calibration stage of the optical M-QAM transmitter system. A low threshold value is indicative of robust skew detection and correction. If the optical power is not higher than the pre-determined threshold value, the phase shifter is nominally set to 90 degree and the optical shutter after the interferometric structure is opened, at 516. This can prepare the optical M-QAM transmitter system to operate in the transmission mode. The coarse and fine skew correction procedures shown in FIGS. 7 and 8 can be a one-time calibration performed after each power cycle or reset of the optical M-QAM transmitter system and the loop convergence time should be less than 100 ms.

The methods and apparatus for detecting and compensating for skew described in FIGS. 1-8 relate to a single polarization M-QAM transmitter. The methods and apparatus can also be applied to or embodied in a polarization multiplexed (PM) M-QAM transmitter where two or more M-QAM transmitters in substantially orthogonal polarization states are multiplexed in the polarization domain. The M-QAM transmitter can be paired with either a direct detection receiver or a coherent receiver. Specific examples include direct detection differential QPSK (DOPSK), coherent PM-QPSK (i.e., coherent PM-4-QAM), coherent PM-16-QAM, and/or the like.

The methods and apparatus for detecting and compensating for skew described in FIGS. 1-8 has a number of distinctive advantages over known methods for skew detection and correction. The proposed methods leverages optical coherent interference properties and can compensate for combined skews originating from the digital domain, the analog domain and the optical domain. The proposed methods can also detect skews in very large ranges (100's of UI) and the detection accuracy can be very precise (<5% of UI). The proposed methods use a low-speed, cost-effective monitor photo detector. Furthermore, the proposed methods leverages stable phase bias points of a semiconductor based modulator, and thus do not require active locking Additionally, the proposed methods can apply to both a single polarization transmitter and a polarization-multiplexed transmitter. The proposed methods can also apply to both direct detection receivers and coherent receivers.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. For example, in some embodiments, the detector used in the optical M-QAM transmitter system (e.g., detector 260 in FIG. 2) can be an RF detector. In such embodiments, the detector can be, for example, a root mean square (RMS) RF detector that outputs a direct current (DC) voltage that is linearly proportional to the log input RF power, a threshold RF detector that uses an external resistor or threshold voltage and can output a TTL compatible signal when the RF power level exceeds the preset threshold, an RF log power detector that can provide a DC output voltage that is log-linearly proportional to its input RF power level, an RF Schottky peak detector that can combine a temperature compensated Schottky diode peak detector and a buffer amplifier to detect the RF input voltage peak using the on-chip Schottky diode, and/or the like.

Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising:
an optical transmitter system defining an interferometric structure and including an in-phase portion and a quadrature portion,
the optical transmitter system being capable of being in a transmission configuration and a calibration configuration,
the interferometric structure being configured to produce an output associated with a skew between the in-phase portion and the quadrature portion of the optical transmitter system when in the calibration configuration,
the skew being associated with a digital domain, an analog domain, and an optical domain of the optical transmitter system, and
the skew being associated with a first time period;
an optical shutter including a first configuration and a second configuration, and being configured to:
block, in the first configuration, an output of the optical transmitter system when the optical transmitter system is in the calibration configuration, and
pass, in the second configuration, an output of the optical transmitter system when the optical transmitter system is not in the calibration configuration; and
a control module configured to:
send a training signal associated with the first time period and having a symbol unit interval,
receive an output value of the interferometric structure associated with the first time period,
calculate the skew associated with the first time period between the in-phase portion and the quadrature portion of the interferometric structure based on the output value, and
send a calibration signal associated with the first time period to the optical transmitter system,
the calibration signal causing at least one of a delay for the in-phase portion or a delay for the quadrature portion of the optical transmitter system to be modified, and a driver level of a radio frequency (RF) component, of the optical transmitter system, to be modified.

2. The apparatus of claim 1, wherein the optical transmitter system includes a digital component associated with the digital domain, the RF component associated with the analog domain, and an optical component associated with the optical domain.

3. The apparatus of claim 1, wherein:
the in-phase portion of the optical transmitter system includes a digital-to-analog convertor associated with the digital domain, an amplifier associated with the analog domain, and a Mach-Zehnder modulator (MZM) associated with the optical domain; and
the quadrature portion of the optical transmitter system includes a digital-to-analog convertor associated with the digital domain, an amplifier associated with the analog domain, and a MZM associated with the optical domain.

4. The apparatus of claim 1, wherein:
the in-phase portion of the optical transmitter system includes a radio frequency (RF) amplifier and a Mach-Zehnder modulator (MZM),
the in-phase portion of the optical transmitter system being configured to:
receive a training signal from a digital processor, and
send an output from the MZM of the in-phase portion to a detector;
the quadrature portion of the optical transmitter system includes an RF amplifier and a MZM,
the quadrature portion of the optical transmitter system being configured to:
receive the training signal from the digital processor, and
send an output from the MZM of quadrature portion to the detector.

5. The apparatus of claim 1, further comprising:
a phase shifter coupled to at least one of a Mach-Zehnder modulator (MZM) of the in-phase portion or a MZM of the quadrature portion,
the phase shifter being configured to apply a substantially 180 degree phase shift to one of a training signal on the in-phase portion of the optical transmitter system or a training signal on the quadrature portion of the optical transmitter system when the optical transmitter system is in the calibration configuration.

6. The apparatus of claim 1, further comprising:
a phase shifter coupled to at least one of a Mach-Zehnder modulator (MZM) of the in-phase portion or a MZM of the quadrature portion,
the MZM of the in-phase portion and the MZM of the quadrature portion collectively being configured to receive a polarity inverted training signal, and
the phase shifter being configured to apply a substantially zero degree phase shift.

7. The apparatus of claim 1, where:
the optical transmitter system includes a digital processor configured to:
send a training signal to the in-phase portion and the quadrature portion of the optical transmitter system, and
modify at least one of a delay value of the in-phase portion or a delay value of the quadrature portion based on the output.

8. The apparatus of claim 1, where the control module is further configured to:
receive a value of the output of the interferometric structure,
calculate the skew based on the received output value,
send a calibration signal such that at least one of a delay for the in-phase portion or a delay for the quadrature portion of the optical transmitter system is modified.

9. The apparatus of claim 1, wherein:
the optical transmitter system is configured to send an optical signal having an M-ary quadrature amplitude modulation (M-QAM) modulation scheme at a bit rate of at least 100Gb/s and with the skew being less than a symbol unit interval (UI) of the optical signal.

10. The apparatus of claim 1, where the control module is further configured to:
send a training signal associated with a second time period after the first time period and having a symbol unit interval greater than the symbol unit interval of the training signal for the first time period,
receive an output value of the interferometric structure of the optical transmitter system associated with the second time period,
calculate a skew associated with the second time period between the in-phase portion and the quadrature portion of the interferometric structure based on the output value for the second time period,
the skew for the second time period being associated with the digital domain, the analog domain, and the optical domain of the optical transmitter system, and
send a calibration signal associated with the second time period to the optical transmitter system such that at least one of the delay for the in-phase portion or the delay for the quadrature portion of the optical transmitter system is modified.

11. An apparatus, comprising:
an optical transmitter system defining an interferometer having an in-phase portion and a quadrature portion, the optical transmitter system including a radio frequency (RF) component; and
a control module configured to send a training signal associated with a first time period and having a symbol unit interval, the control module configured to receive an output value of the interferometer associated with the first time period, the control module configured to calculate a skew associated with the first time period between the in-phase portion and the quadrature portion of the interferometer based on the output value, the skew associated with a digital domain, an analog domain and an optical domain of the optical transmitter system, the control module configured to send a calibration signal associated with the first time period to the optical transmitter system such that (1) at least one of a delay for the in-phase portion or a delay for the quadrature portion of the optical transmitter system is modified, and (2) a driver level of the RF component is modified,
the control module configured to send a training signal associated with a second time period after the first time period and having a symbol unit interval greater than the symbol unit interval of the training signal for the first time period,
the control module configured to receive an output value of the interferometer of the optical transmitter system associated with the second time period,
the control module configured to calculate a skew associated with the second time period between the in-phase portion and the quadrature portion of the interferometer based on the output for the second time period, the skew for the second time period being associated with the digital domain, the analog domain and the optical domain of the optical transmitter system, the control module configured to send a calibration signal associated with the second time period to the optical transmitter system such that at least one of the delay for the in-phase portion or the delay for the quadrature portion of the optical transmitter system is modified.

12. The apparatus of claim 11, wherein the symbol unit interval of the training signal for the first time period is greater than a symbol unit interval associated with a baud rate of the optical transmitter system, the symbol unit interval of the training signal for the second time period is less than the symbol unit interval associated with the baud rate of the optical transmitter system.

13. The apparatus of claim 11, wherein:
the optical transmitter system includes a digital component associated with the digital domain and an optical component associated with the optical domain,
the RF component is associated with the analog domain.

14. The apparatus of claim 11, wherein:
the in-phase portion of the optical transmitter system includes a digital-to-analog convertor associated with the digital domain, an amplifier associated with the analog domain, and a Mach-Zehnder modulator (MZM) associated with the optical domain; and
the quadrature portion of the optical transmitter system includes a digital-to-analog convertor associated with the digital domain, an amplifier associated with the analog domain, and a MZM associated with the optical domain.

15. The apparatus of claim 11, wherein:
the optical transmitter system has a transmission configuration and a calibration configuration, the optical transmitter system defines the interferometer when the optical transmitter system is in the calibration configuration,
the control module configured to receive the output value associated with the first time period, calculate the skew associated with the first time period and send the calibration signal associated with the first time period when the optical transmitter system is in the calibration configuration.

16. A method, comprising:
receiving, by a device, an output value of an interferometer of an optical transmitter system;
calculating, by the device, a skew between an in-phase portion and an quadrature portion of the interferometer based on the output value,
the output value and the skew being associated with a first time period, and
the skew being associated with a digital domain, an analog domain, and an optical domain of the optical transmitter system;
sending, by the device, a calibration signal to the optical transmitter system such that at least one of a delay for the in-phase portion or a delay for the quadrature portion of the optical transmitter system is modified,
the calibration signal being associated with the first time period;
sending, by the device, a warning signal before a power failure of the optical transmitter system when an output value of the interferometer exceeds a threshold;
sending, by the device, a training signal associated with the first time period and having a symbol unit interval;
sending, by the device, a training signal associated with a second time period after the first time period and having a symbol unit interval greater than the symbol unit interval of the training signal for the first time period;

receiving, by the device, an output value of the interferometer of the optical transmitter system associated with the second time period;
calculating, by the device, a skew associated with the second time period between the in-phase portion and the quadrature portion of the interferometer based on the output value associated with the second time period,
the skew for the second time period being associated with the digital domain, the analog domain, and the optical domain of the optical transmitter system; and
sending, by the device, a calibration signal associated with the second time period to the optical transmitter system such that at least one of the delay for the in-phase portion or the delay for the quadrature portion of the optical transmitter system is modified.

17. The method of claim 16, where each of the output value, the skew, and the calibration signal is associated with a training signal that includes a first symbol unit interval, and the first symbol unit interval is greater than a symbol unit interval associated with a baud rate of the optical transmitter system, the method further comprising;
repeating the receiving the output value associated with the first time period, the calculating the skew associated with the first time period, and the sending the calibration signal, based on a training signal having a second symbol unit interval,
the second symbol unit interval being less than the symbol unit interval associated with the baud rate of the optical transmitter system after the sending the calibration signal associated with the training signal having the first symbol unit interval.

18. The method of claim 16, where each of the output value, the skew, and the calibration signal is associated with a training signal that includes a first symbol unit interval, and the first symbol unit interval is greater than a symbol unit interval associated with a baud rate of the optical transmitter system, the method further comprising:
repeating the receiving the output value associated with the first time period, the calculating the skew associated with the first time period, and the sending the calibration signal, based on a training signal having a second symbol unit interval,
the second symbol unit interval being less than the symbol unit interval associated with the baud rate of the optical transmitter system after the sending the calibration signal associated with the training signal having the first symbol unit interval, and
at least one of the delay for the in-phase portion or the delay for the quadrature portion for the training signal having the first symbol unit interval is greater than at least one of the delay for the in-phase portion or the delay for the quadrature portion for the training signal having the second symbol unit interval.

19. The method of claim 16, wherein the optical transmitter system includes a digital component associated with the digital domain, a radio frequency (RF) component associated with the analog domain, and an optical component associated with the optical domain.

20. The method of claim 16, wherein:
the in-phase portion of the optical transmitter system includes a digital-to-analog convertor associated with the digital domain, an amplifier associated with the analog domain, and a Mach-Zehnder modulator (MZM) associated with the optical domain; and
the quadrature portion of the optical transmitter system includes a digital-to-analog convertor associated with the digital domain, an amplifier associated with the analog domain, and a MZM associated with the optical domain.

* * * * *